(12) United States Patent
Hafermalz et al.

(10) Patent No.: US 6,612,336 B1  
(45) Date of Patent: Sep. 2, 2003

(54) ROTARY SHIFT VALVE FOR SERVO-ASSISTED STEERING SYSTEMS OF MOTOR VEHICLES

(75) Inventors: Jens-Uwe Hafermalz, Landau-Mörzheim (DE); Peter Ertle, Durlangen (DE); Karl-Heinz Urban, Spraitbach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 09/744,408

(22) PCT Filed: Jul. 17, 1999

(86) PCT No.: PCT/EP99/05120

§ 371 (c)(1), (2), (4) Date: Mar. 5, 2001

(87) PCT Pub. No.: WO00/05125

PCT Pub. Date: Feb. 3, 2000

(30) Foreign Application Priority Data

Jul. 24, 1998 (DE) .......................... 198 33 438

(51) Int. Cl.⁷ .................... F15B 9/10; B62D 5/083
(52) U.S. Cl. ................... 137/625.23; 91/375 A
(58) Field of Search ............. 137/625.21, 625.22, 137/625.23, 625.24; 91/375 A, 375 R

(56) References Cited

U.S. PATENT DOCUMENTS

| | | | |
|---|---|---|---|
| 4,137,989 A | * 2/1979 | Rehfeld ............. | 91/375 A |
| 4,285,266 A | * 8/1981 | Elser .................. | 91/375 A |
| 4,290,452 A | * 9/1981 | Takahashi et al. ..... | 137/625.23 |
| 4,905,782 A | * 3/1990 | Rieger et al. ........ | 91/375 A |
| 5,086,687 A | * 2/1992 | Elser et al. ......... | 137/625.24 |
| 5,517,899 A | * 5/1996 | Bohner ............... | 91/375 A |
| 5,538,096 A | * 7/1996 | Breitweg ............. | 91/375 A |

FOREIGN PATENT DOCUMENTS

| | | |
|---|---|---|
| DE | 11 01 186 | 3/1961 |
| DE | 1 913 837 | 3/1974 |
| DE | 41 39 506 | 6/1992 |
| DE | 41 38 885 | 6/1993 |
| DE | 32 42 445 | 6/1994 |
| DE | 196 44 511 | 4/1998 |
| EP | 0 171 247 | 9/1990 |
| WO | 87/04678 | 8/1987 |
| WO | 94/00329 | 1/1994 |

\* cited by examiner

*Primary Examiner*—John Rivell  
(74) *Attorney, Agent, or Firm*—Kenyon & Kenyon

(57) ABSTRACT

A rotary disk valve for motor vehicle power steering systems includes rotary disk which is connected non-rotatably to a valve inlet element. A control bushing is connected non-rotatably to a valve outlet element. These two valve elements are disposed so that they are coaxially movable into one another and are rotatable by at most the amount of torsion of a dead travel coupling. The two valve elements have longitudinal control grooves, which interact with one another for controlling a pressure medium to and from two working areas of a servo motor and to a return connection for a pressure medium container. The rotary disk is connected via a torsion bar spring to the valve outlet element. The longitudinal control grooves of the radially internal valve element connected to the return connection are connected to an internal space of the radially internal valve element. The torsion bar spring is supported in this internal space via a roller bearing. The return from the inner space of the radially internal valve element to the return connection occurs through the roller bearing and through the dead travel coupling.

4 Claims, 2 Drawing Sheets

ROTARY SHIFT VALVE FOR SERVO-ASSISTED STEERING SYSTEMS OF MOTOR VEHICLES

FIELD OF THE INVENTION

The present invention relates to a rotary-disk valve for motor vehicle power steering systems.

BACKGROUND INFORMATION

The rotary-disk valve according to the present invention contains two valve elements, which are movable coaxially into one another and are turnable with respect to one another to a limited degree in order to obtain a control path. A first valve element, which is connected non-rotatably to a valve inlet element, is connected to a valve outlet element via a torsion bar spring and via a mechanical drive in the form of a dead travel coupling. A second valve element is connected non-rotatably to a valve outlet element. The radially external valve element has internal longitudinal control grooves and the radially internal valve element has external longitudinal control grooves, which interact with one another in order to control a pressure medium to and from two working chambers of the servo motor and to a return connection for a pressure medium container.

Such a rotary disk valve is described, for example, in German Published Patent Application No. 1 913 837. In this rotary-disk valve, the pressure medium returns to the pressure medium container directly from the return grooves to a return connection. For this purpose, the return grooves are open to one side. This results in an interrupted bearing point on the circumference between the two valve elements, thereby resulting in certain disadvantages. Such a valve may tend to seize, which in turn may lead to undesirable noises and a poor steering feel.

A further rotary disk valve is described in European Published Patent Application 0 171 247. In this rotary disk valve, the return grooves are closed on both sides in their axial length. Return from the return grooves to the return connection occurs through an inner space in the radially internal valve element and via a diagonal hole in the radially internal valve element. Such diagonal holes are complicated and expensive to manufacture. In this radial disk valve, the radially internal valve element is supported on the torsion bar spring by a sliding bearing.

International Published Patent Application No. WO 87/04678 describes a rotary disk valve having a rotary disk, a control bushing surrounding a rotary disk and a working shaft, which is connectable with a pinion that engages with a gear rack. A pressure medium flow delivered by a pump is introduced into a circular groove of the valve housing surrounding these parts. The distribution of the pressure medium flow occurs according to the position of the control grooves, control edges and control holes in the rotary disk and the control bushing in hydraulic lines that lead to a working cylinder. A return line, which is supplied via a gap between the inner wall of the bearing parts and the torsion bar, is used for the return of the pressure medium.

One object of the present invention is to provide a rotary disk valve which can be produced simply and inexpensively. In addition, the return may be made without significant pressure losses, and the valve may be operated with as little friction and seizing as possible.

SUMMARY

The above and other beneficial objects of the present invention are achieved by providing a rotary disk valve which the rotary disk valve includes a return from the longitudinal grooves of the radially internal valve element controlling the return to the return connection through a roller bearing.

In a first embodiment, the roller bearing is one of the roller bearings with which the first valve element is supported in the other valve element.

In a second embodiment, the longitudinal control grooves of the radially internal valve element controlling the return connection are connected to an inner space of the radially internal valve element, and the torsion bar spring is supported in the inner space of the radially internal valve element via a roller bearing. The return from the inner space of the radially internal valve element to the return connection occurs through the roller bearing and the dead travel coupling. If the roller bearing is designed as a needle bearing, this bearing may be equipped with a needle cage, which has a cross-section favorable to flow and is provided with flow openings that permit the returning pressure medium to flow without a significant pressure drop. In addition, such a bearing may be installed under pre-stress, so that support of the internal valve element can be achieved without play together with a favorable rolling friction at the same time. Also seizing of the valve and the appearance of noises and abrupt changes in torque connected therewith is avoided.

If the longitudinal control grooves controlling the return connection of the radially internal valve element are connected to an internal space of the radially internal valve element, the torsion bar spring is supported in the internal area of the radially internal valve element via a roller bearing and return from the inner space of the radially internal valve element to the return connection occur through the roller bearing and through the dead travel coupling.

DETAILED DESCRIPTION

Figure 1:
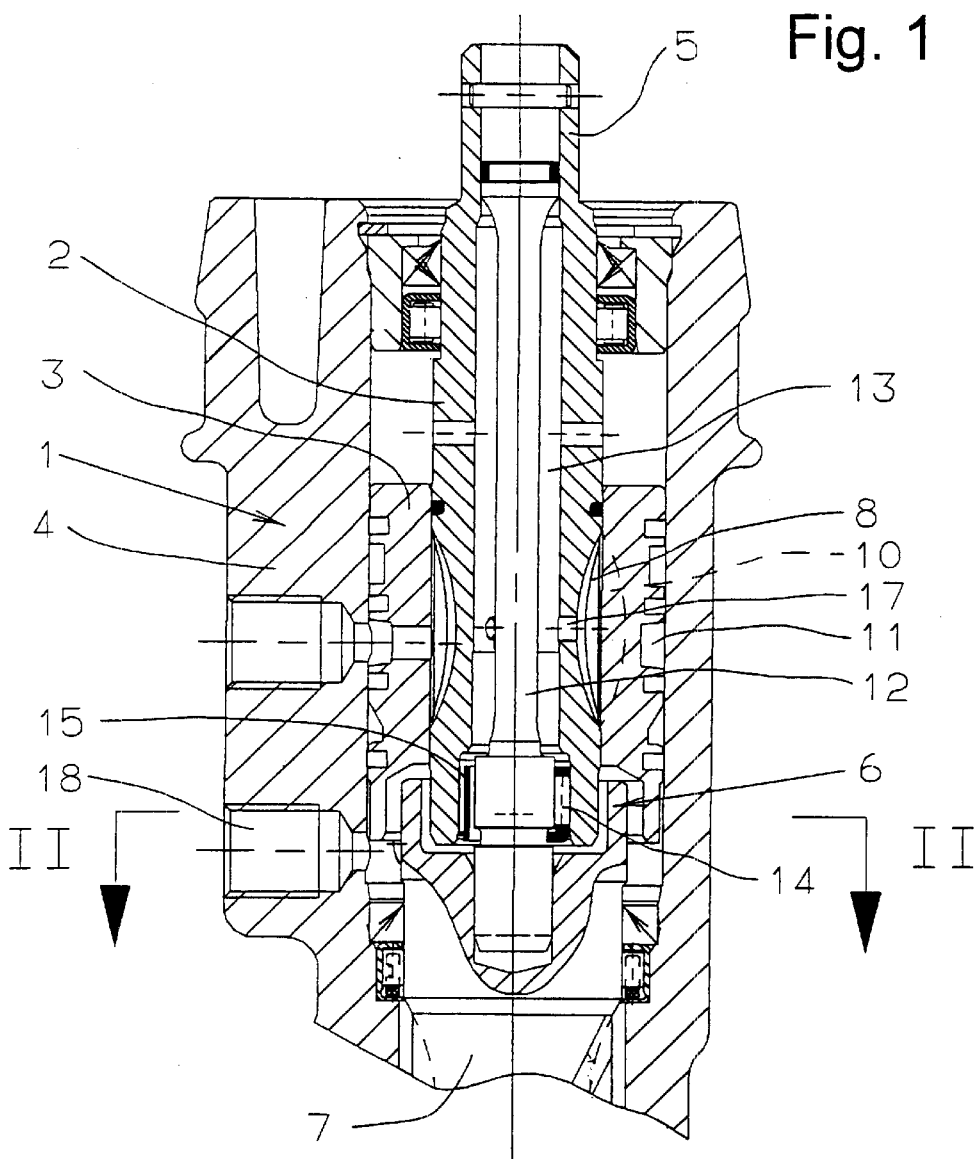
FIG. 1 is a cross-sectional view of a rotary disk valve according to the present invention in a rack-and-pinion power steering system.
Figure 2:
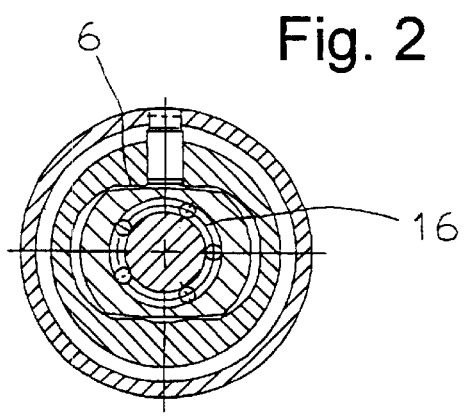
FIG. 2 is a cross-sectional view of the rotary disk valve taken along the line II—II shown in FIG. 1.

Rotary disk valve 1 according to the present invention includes a first valve element in the form of a rotary disk 2 and a second valve element, which is designed as a control bushing 3. The two valve elements are arranged to be capable of moving coaxially into one another in a valve housing 4. Rotary disk 2 is the radially internal valve element, and control bushing 3 is the radially external valve element. The two valve elements may be exchanged with the same effect, so that rotary disk 2 is the radially external valve element, and control bushing 3 is the radially internal valve element. Rotary disk 2 is connected non-rotatably to a valve inlet element 5, which is designed as a steering spindle connection. For example, the steering spindle connection is connected to a steering spindle, not shown, which bears a steering wheel, via a universal joint, also not shown. In addition, rotary disk 2 is connected via a mechanical connection in the form of a dead travel coupling 6 to a valve outlet element 7. The valve outlet element 7 may be designed as a rack-and-pinion drive or as a ball threaded spindle, depending on the use of the rotary disk valve in the case of rack-and-pinion or ball-nut power steering systems.

Longitudinal control grooves 8, which interact with longitudinal control grooves 10 in the interior of control bushing 3, are disposed on the outer surface area of rotary disk 2. Rotary disk valve 1 represents, depending on the direction of rotation, a pressure medium connection via longitudinal control grooves 8 and 10, as well as via annular grooves 11 in control bushing 3 to a servo motor, not shown. Valve inlet element 5 is also connected to valve outlet element 7 via a torsion bar spring 12.

In the interior of rotary disk 2, there is an interior space 13, in which torsion bar spring 12 is mounted, in the vicinity of its end connected non-rotatably to valve outlet element 7, via a roller bearing 14. Roller bearing 14 may be designed as a needle bearing, the needle cage of which has a cross-section favorable to flow and relatively large flow openings 16. Thus, a flow can pass through the needle bearing without significant pressure drop.

With such a needle bearing it is possible to guide the pressure medium flowing back from the servo motor (not shown) out of longitudinal control grooves 8 via a radial hole 17 in rotary disk 2 via internal space 13, through flow openings 16 of roller bearing 14 and via the areas of dead travel coupling 6 through which the flow passes to a return connection 18.

A very rigid valve structure is achieved by the oil flow through the roller bearing. The stick-slip effects between the control bushing and the rotary disk are thereby reduced. In addition, the advantage of the roller bearing may be used. This advantage is characterized by the installation of the rotary disk without play with simultaneous insensitivity to transverse force. The noise behavior, the self-steering effect, and the tendency of the valve to seize are reduced.

Figure 3:
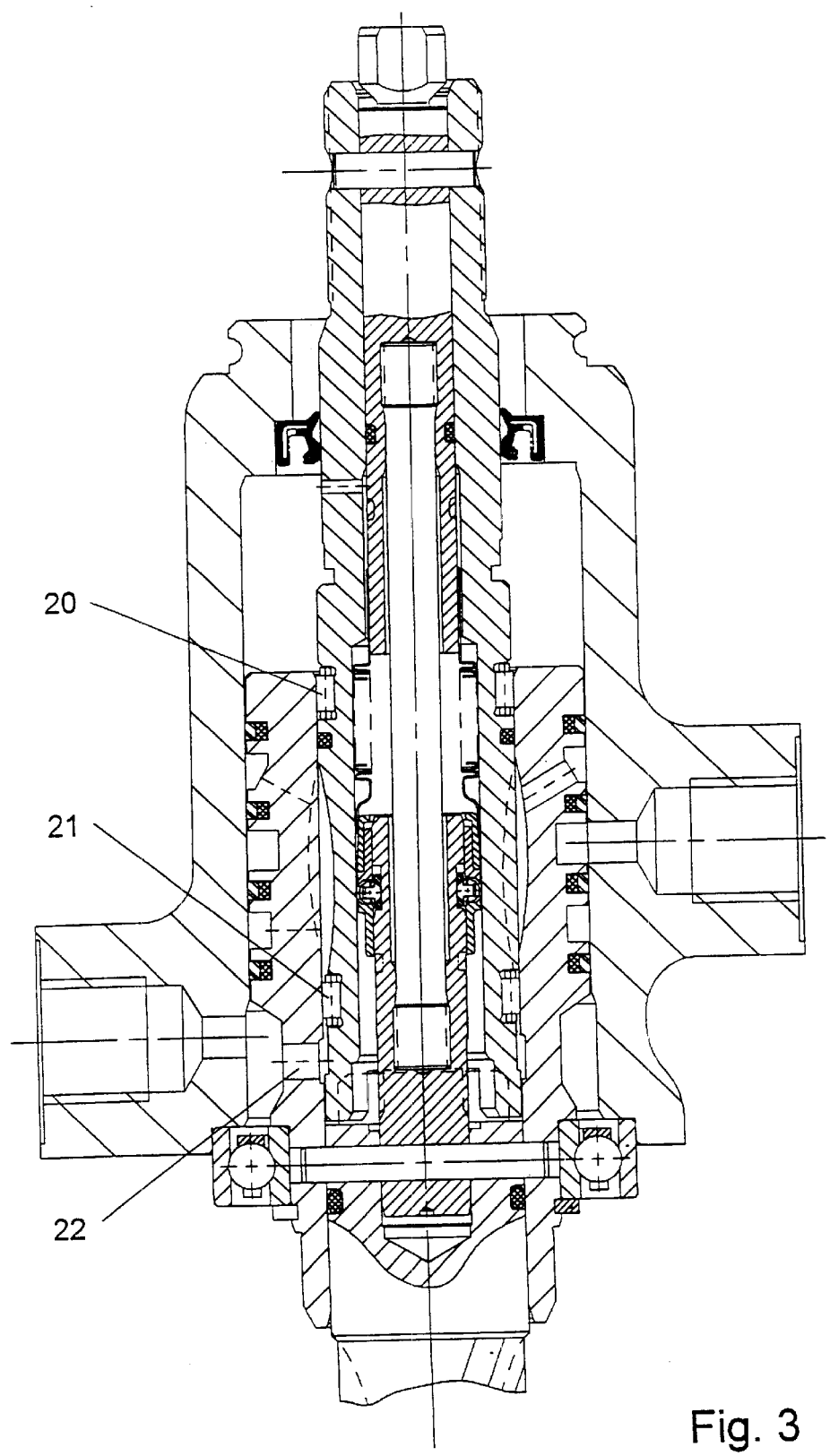
FIG. 3 is a cross-sectional view of a second embodiment of a rotary disk valve according to the present invention.

These advantages are also achieved in the embodiment shown in FIG. 3. In this embodiment, rotary disk 2 in control bushing 3 is supported by two roller bearings 20, 21, in the form of two needle bearings. The return from longitudinal control grooves 8 of the radially internal valve element, which control the return to return connection 18, occurs through first roller bearing 21 and through a hole 22 located in the control bushing 3.

What is claimed is:

1. A rotary disk valve for a power steering system of a motor vehicle, comprising:

a valve housing;

a valve inlet element;

a first valve element non-rotatably connected to the valve inlet element;

a valve outlet element;

a second valve element non-rotatably connected to the valve outlet element;

a torsion bar spring;

a mechanical drive including a dead travel coupling; and a first roller bearing; and a second roller bearing, the first roller bearing and the second roller bearing supporting the first valve element in the second valve element;

wherein the first valve element is connected to the valve outlet element via the torsion bar spring and the dead travel coupling;

wherein the first valve element and the second valve element are arranged in the valve housing coaxially movable into each other and rotatable relative to each other by at most an amount of torsion of the dead travel coupling;

wherein a radially external one of the first valve element and the second valve element includes internal longitudinal control grooves and a radially internal one of the first valve element and the second valve element includes external longitudinal control grooves, the internal longitudinal control grooves and the external longitudinal control grooves interacting to control a pressure medium to and from two working spaces of a servo motor and to a return connection for a pressure medium container; and wherein a return from the longitudinal control grooves of the radially internal valve element controls the return to the return connection via the first roller bearing.

2. The rotary disk valve according to claim 1, wherein at least one of the first roller bearing and the second roller bearing includes a needle bearing.

3. The rotary disk valve according to claim 2, wherein the needle bearing includes a needle cage having a cross-section favorable to flow and having flow openings that permit the returning pressure medium to flow without a significant pressure drop.

4. A rotary disk valve for a power steering system of a motor vehicle, comprising:

a valve housing;

a valve inlet element;

a first valve element non-rotatably connected to the valve inlet element;

a valve outlet element;

a second valve element non-rotatably connected to the valve outlet element;

a torsion bar spring;

a mechanical drive including a dead travel coupling; and a first roller bearing;

wherein the first valve element is connected to the valve outlet element via the torsion bar spring and the dead travel coupling;

wherein the first valve element and the second valve element are arranged in the valve housing coaxially movable into each other and rotatable relative to each other by at most an amount of torsion of the dead travel coupling;

wherein a radially external one of the first valve element and the second valve element includes internal longitudinal control grooves and a radially internal one of the first valve element and the second valve element includes external longitudinal control grooves, the internal longitudinal control grooves and the external longitudinal control grooves interacting to control a pressure medium to and from two working spaces of a servo motor and to a return connection for a pressure medium container;

wherein a return from the longitudinal control grooves of the radially internal valve element controls the return to the return connection via the first roller bearing; and wherein the longitudinal control grooves of the radially internal valve element is connected to an inner space of the radially internal valve element, the torsion bar spring being supported in an inner space of the radially internal valve element via the first roller bearing, the return from the inner space of the radially internal valve element to the return connection occurring through the first roller bearing and through the dead travel coupling.

* * * * *

UNITED STATES PATENT AND TRADEMARK OFFICE
CERTIFICATE OF CORRECTION

PATENT NO.     : 6,612,336 B1
DATED          : September 2, 2003
INVENTOR(S)    : Hafermalz et al.

It is certified that error appears in the above-identified patent and that said Letters Patent is hereby corrected as shown below:

Title page,
Item [57], ABSTRACT,
Line 2, after "includes" insert -- a --;

Column 2,
Line 1, before "which" insert -- in --;
Line 31, after "bearing" insert -- , --; and
Line 33, change "occur" to -- occurs --.

Signed and Sealed this

Tenth Day of August, 2004

JON W. DUDAS
*Acting Director of the United States Patent and Trademark Office*